July 5, 1966  F. H. WOOD  3,259,890
INDICATING INSTRUMENTS
Filed Dec. 12, 1962  2 Sheets-Sheet 1

INVENTOR
FRANCIS H. WOOD
BY
ATTORNEYS

July 5, 1966 F. H. WOOD 3,259,890
INDICATING INSTRUMENTS
Filed Dec. 12, 1962 2 Sheets-Sheet 2

INVENTOR
FRANCIS H. WOOD
BY
ATTORNEYS

United States Patent Office 3,259,890
Patented July 5, 1966

3,259,890
INDICATING INSTRUMENTS
Francis Harold Wood, Watford, England, assignor of one-half to Elliott Brothers (London) Limited, London, England, a British company
Filed Dec. 12, 1962, Ser. No. 244,063
Claims priority, application Great Britain, Dec. 14, 1961, 44,869/61
15 Claims. (Cl. 340—195)

This invention relates to indicating instruments in the nature of rate of turn indicators. By the invention means are provided for indicating, measuring or signalling rate of turn about two coordinate axes and if required either to differentiate rates about each axis or to integrate them as a vector or resultant. Such an instrument may (for example in an aircraft or other body with at least two degrees of angular freedom) be used for measurement or indication, or signals which it yields may be used to actuate further devices such as automatic pilots.

The invention affords means whereby, in a simple manner, rate of turn in two degrees of angular freedom may be indicated both as to the rate and the orientation of angular change.

In the following descriptions and claims reference is made to a "bar." This term is intended to include any massive element which has a greater moment of inertia about a first axis than about a second axis perpendicular to the first. Reference is also made to an "obturator." This is intended to include not only a shutter-like device which may pass or obstruct a beam, but also a reflector system which may reflect or not reflect a beam. The word "beam" is employed to include a beam of energy such as visible light, or other parts of the electromagnetic wave spectrum generated by, and receivable by, a suitable source and suitably sensitive receiver, and therefore including infra-red, ultraviolet, and other "rays" within the general category.

The invention resides in applications of the behaviour of a rockably pivoted bar which is spun on an axis perpendicular to its pivot rocking axis. The radial extremities of such a bar may be regarded as having an orbit which in undisturbed conditions is circular about the first axis, but which when disturbed is an oscillating path defined by a frusto-spherical shape, the spherical centre of which coincides with the first and second axis about which the bar moves.

The invention resides in an indicating instrument comprising a bar pivotally supported to rock on a first axis by a gimbal member which is in turn mounted for spinning on a second axis perpendicular to the first and which is associated with means so as to spin it, and means for indicating, measuring or signalling oscillations of the bar on the first axis in terms of amplitude and of phase of such oscillations with reference to the second axis. It is to be noted that the frequency of such oscillations is a function of the rate of spinning of the bar, and can thus be selected or adjusted as may be expedient.

By a further feature of the invention the bar is a permanent magnet or of magnetic material, and is arranged to cause changes of magnetic flux when spinning and oscillating, whereby electrical measuring, indicating, or signalling is achieved.

By another feature of the invention, the bar spins with obturator means controlling the passage of a beam between a beam projector and beam receiver so that the orientation of the bar and therefore the obturator affords a measure, indicator, or signal, of the oscillations of the bar. Such obturator may (as previously indicated) comprise an element which is partly transparent and partly opaque to the beam (which is for example a beam of visible light) or it may comprise a mirror system to reflect rather than to pass, the beam.

Preferably when a beam system is employed, a plurality of beams are provided each with its projector and receiver, disposed symmetrically around the second—that is the spin—axis, with such angular disposition as to enable the phase of oscillation about that axis to be determined. A convenient arrangement is, four beams at 90° spacing, around the second axis.

The invention will now be described in two examples (the first with a variant) with the aid of the accompanying schematic drawings in which.

Figure 5:
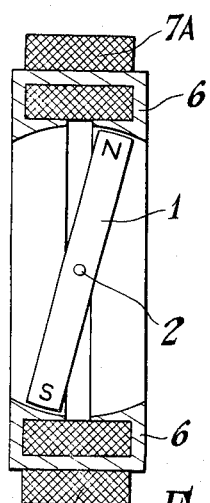
Figure 6:
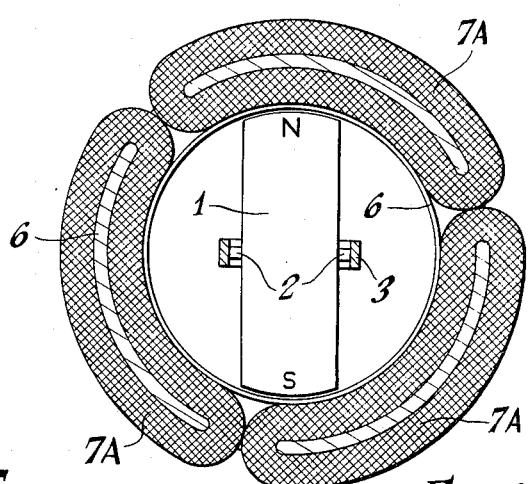
Figure 7:
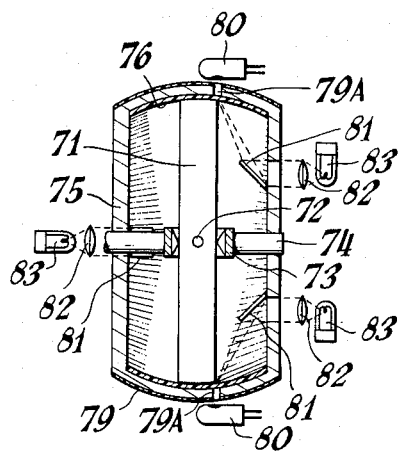
Figure 8:
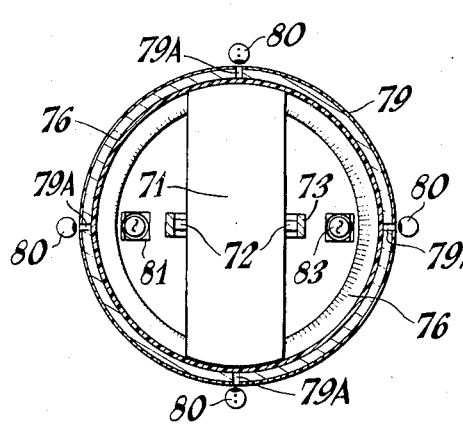

FIGURES 5 and 6 similarly illustrate a variant adapted for 3-wire output;

FIGURE 7 is a schematic elevation of the second example in part section;

FIGURE 8 of the second example is a view along the spinning axis; and

Figure 9:
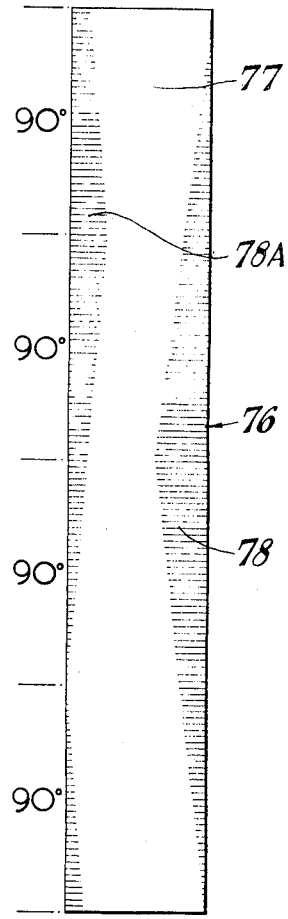

FIGURE 9 of the second example represents a development of the obturating shell.

Figure 1:
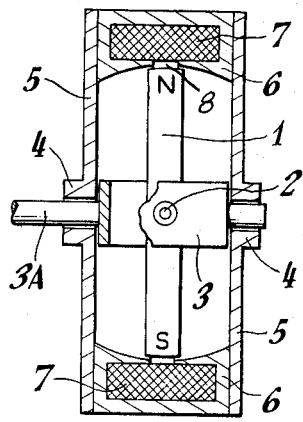
FIGURES 1, 2 and 3 illustrate diagrammatically and in section the fundamental elements.
Figure 2:
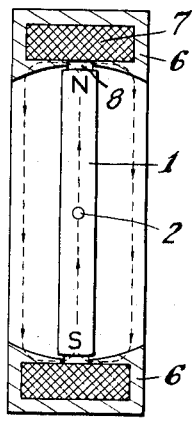
Figure 3:
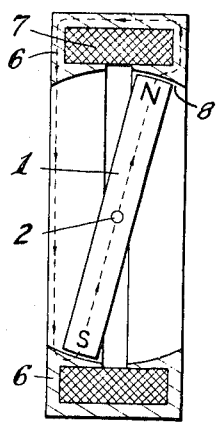

In FIGURES 1, 2 and 3, the device consists of a bipolar permanent magnet bar 1 pivoted on a first axis at 2 about its centre line equidistant from its poles, within a non-magnetic gimbal member or frame 3 such that a restricted angle of rock or tilt of bar 1 can take place. The frame 3 having the driving shaft 3A is spinnable in bearings 4 whose axis is normal to that of the pivots 2, the poles of the magnet 1 being symmetrical about such bearing axis. The bearings 4 are housed in non-magnetic material plates 5 supporting co-axially and peripherally a magnetic circuit hollow ring 6 of material such as iron which provides a return path for the flux of the magnet 1. An annular peripheral coil 7 is housed inside the hollow ring 6. The construction of the hollow ring 6 is such that the reluctance of its path circumferentially is less than the reluctance of the path of its cross section. A simple modification is that the gimbal member is a rod or spindle passing through a clearance aperture in the bar 1 and having a pivot attachment on the axis 2.

A description of the operation of the device will now follow:

Rotation of shaft 3A will cause the frame 3 to spin thereby spinning the magnet bar 1. The bar 1 will erect itself under the influence of centrifugal force until it is normal to the axis of the rotating shaft 3A. The flux from the magnet bar 1 will pass across the gap 8 and pass into the inner face of the hollow ring 6 where it will travel the path of least reluctance being the peripheral or circumferential path of the innermost portion of the hollow ring 6 back to the other pole of the magnet 1. Any flux passing round the circuit will take the circumferential path and will, therefore, not cut the coil 7 at all. No voltage will therefore be measured across the coil 7.

With the instrument running, a turn other than one coaxial with shaft 3A will cause the bar 1 to oscillate in a sinusoidal manner about its pivots 2 (e.g., to an attitude such as that of FIGURE 3). The amplitude of the oscillation will be a function of the rate of such turn. The frequency of the oscillation will be constant by reference to the rotational speed about the second axis, namely that of the drive shaft 3A. The phase of the sinusoidal oscillation when measured with respect to the second axis will be a function of the orientation of the axis about which the rate of turn of the whole assembly is taking place and therefore corresponds to the orientation of the plane in which the turn takes place.

The rocking oscillation of the bar 1 on the first axis at 2 will cause the reluctance path of the hollow ring 6 to vary with respect to the bar by reason of the cross-sectional reluctance of the hollow ring 6 being high compared to the circumferential reluctance. Any relative rocking of the bar 1 (as seen in FIGURE 3) will cause the flux to modify its path from a truly circumferential path to one avoiding the high reluctance cross-section. This feature will cause the flux to pass from one pole (say, "N") through the coil 7 and return round the outside circumferential path to the other pole (say, "S") of the bar. The flux is indicated notionally in FIGURES 2 and 3 by arrow dotted lines. The "switching" of the flux in this manner will occur sinusoidally and will be in sympathy with the rocking oscillation of the bar 1. The amplitude of the oscillation (which is a function of the rate of the turn involved) must traverse a full cycle for one revolution of spin of the input shaft 3A. For this to be possible the linear velocity of the magnet pole pieces must be a function of the rate of turn to be measured. The rate of change of the sinusoidal change of flux cutting the coil 7 is, therefore, a function of the rate of turn to be measured. The voltage induced in the coil 7 is, therefore, a function of the rate of turn to be measured.

Figure 4:
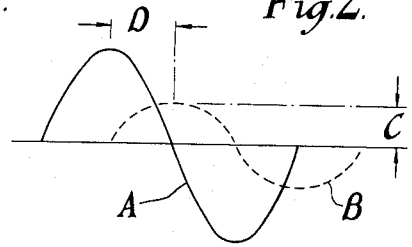
FIGURE 4 illustrates graphically the nature of the signal output of an instrument on the lines of FIGURES 1, 2 and 3.

FIGURE 4 illustrates that amplitude measures rate, and phase-relation indicates orientation of the turn. The bar 1 will be at the point of maximum displacement from the normal when the axis about which it tilts is in or very nearly in the plane about which the rate of turn to be measured is taking place. From this fact it is seen that the phase relationship of the output volts from the coil 7 with respect to the input shaft 3A is a function of orientation of the axis about which the turn is taking place. In FIGURE 4, A indicates a reference phase determined about the second or spin axis; B represents a voltage curve; C indicates amplitude, that is voltage in coil 7, and D is a measure of the phase relation between the reference phase A, and the actual voltage alternation wave.

FIGURES 5 and 6 illustrate an alternative form of flux path ring winding. The ring 6 carries three windings 7A the disposition of which is obvious. In this case, the sensing generator comprising bipolar permanent magnet bar 1 and windings 7A afford 3-wire connection. Functionally this modification is virtually the same as FIGURES 1, 2 and 3. Although only the use of one or three coils has been shown any other number of coils could be used.

If it be required to read the orientation of the turn axis in terms of right-angle coordinates, a commutator, or reed switching operated effectively by and in synchrony with the drive shaft 3A, may be employed to switch the output winding circuit.

This example of the invention is clearly open to considerable modification and adaptation. Damping is afforded by the fact that eddy-currents are produced in the iron mass; this effect may be, by design, of more or less value for example by providing more or less lamination. Positive re-erecting forces are inherent in the centrifugal effects; negative forces may be provided by appropriately shaping the cross-section of the magnetic path (ring 6). Such matters are within the competence of those skilled in the art.

The device as a whole may be isolated from or towards external magnetic effects by being enclosed in a casing of magnetic material which may also serve to maintain internal conditions of temperature, etc. The drive shaft is intended to be run at a constant or deliberately adjusted speed, and obviously, rotating parts should be balanced.

Turning now to the second example of the invention illustrated in FIGURES 7, 8 and 9, the beam in the following is exemplified as a light-beam; it may, however, be an electromagnetic beam outside the visible spectrum, or a beam of radio-frequency, or a beamed part of a magnetic field, in which case its source and receiver and the nature of the obturator are of course appropriately selected.

In this second example, the invention is applied as a turn indicator for aircraft which signals rate of turn and orientation of the axis of such turn in any angular dimension other than those about the spin axis.

A massive bar 71 is pivoted at 72 to rock through a limited angle in a gimbal frame 73, which is carried on stub-spindles 74 in a casing 75. One of the spindles 74 is connected to a motor or the like for spinning of the frame 73 and therefore the bar 71. The bar 71 carries a frusto-spherical shell or obturator 76 of transparent material which is made opaque over a pattern of its area shown best in FIGURE 9, at 77, the remainder of the areas 78, 78A being transparent. FIGURE 9 is a flat development view of the complete shell 76, and it will be seen that the areas 78, 78A extend from each margin or edge of the shell in divergent-convergent manner through 270°, and the areas 78, 78A are (in terms of this pattern) 90° out of phase to each other, whilst the median area 77, subtending the undisturbed orbit of the bar 71, is opaque.

Surrounding the shell 76 is a fixed screen 79 of opaque material, which may form part of the casing 75. The screen 79 has four openings or windows at 79A, outside of each of which are lamps 80 casting a sharply defined beam of light through each window on to the shell 76.

To each side of the normal orbit of spinning of the bar 71 (on which sides the windows 79A are positioned) and within the frusto-sphere defined by the shell 76, are fixed four plane mirrors 81 (a pair on each side) arranged to reflect light from the lamps 80 through lenses 82 for concentration on photosensitive receiver elements 83.

There are, therefore, four light-beam systems which reside in the lamps 80, windows 79A, mirrors 81, and receivers 83. The passage of a beam is, however, controlled by the subtending position of the shell 76 and its opaque or transparent areas, light being obturated or passed according to the relative position of the areas 78, 78A. One pair of beams operates at right angles to the other.

Now, let us consider that the receivers 83 are so connected as to signal or respond to the incidence of light upon them. Let us further suppose that in a steady condition, the bar 71 is being spun (through its pivots at 72 and gimbal frame 73). Subject only to earth's diurnal rotation and to frictional forces or other damping or restoring influences, the plane of rotation of the bar 71 (and the orbit of its extremities) will remain constant; it is to that extent a gyroscope. Now, light from the four lamps is continuously obturated by the medial opaque area on the shell, as represented at 77. No signal is received or responded to by the elements 83.

Suppose now, that the case 75 of the instrument, which in posture corresponds to the aircraft in which it is mounted, turns in (let us assume) the yawing plane. Now an oscillation is induced in the bar 71 about the axis of pivot at 72. The amplitude of this oscillation is a function of the rate of turn, and its frequency, of the rate of spin. The beams of light will now pass through the transparent areas 78, 78A, through an amplitude which will correspond to the rate of turn. Moreover, the phase-relationship of the exposure from obturation of the beams, will correspond to the axis of turn. Thus in the case of a pure yaw the beams of light normal to the axis of turn (in this case the vertical axis) will have their maximum incidence on the pair of receivers 83 which are assumed in this instance to be in the horizontal plane.

If the aircraft (and instrument) be turned in the rolling (athwartships) plane, the other pair of receivers, in the vertical plane, respond. Clearly, a turn which is in vector between yaw and roll, will produce a vectorial signal composed of the signals from all four receivers.

Thus in effect, the receivers operate as pulse signallers, and due to the shaping of the obturator pattern, the duration of pulses is a measure of the amplitude of the oscillation, whilst the phase relation of such pulses is determined by the pair of receivers excited.

Clearly the beams may be visible light, ultraviolet or infra-red (with appropriate sources and receivers) or of other parts of the spectrum of electromagnetic waves. In a slightly more elaborate form, the opacity and transparency of the shell, in the areas 77, 78, 78A, may be such as to blend gradually from opacity to transparency, whereby a variable sensitivity may be afforded. Normally, however, it is proposed to use sharp beams and a sharp obturator cut-off.

The signals from the receivers may be integrated into observable visual indications, either as two indications in respective planes, or a single resultant indication, or they may in like manner be relayed so as to operate servo-systems for control purposes.

I claim:

1. Indicating instrument comprising a bar of magnetic material, a gimbal member, means pivotally rockably interattaching the bar and gimbal member on a first axis, means for spinning said gimbal member on a second axis normal to the first axis, and magnetically inductive means co-operative with said bar to yield electrical signals corresponding to rocking oscillations of the bar whilst spinning.

2. Instrument according to claim 1 in which said bar is a bipolar permanent magnet.

3. Instrument according to claim 1 in which said bar is a bipolar permanent magnet and said magnetically inductive means comprises a coil system arranged circumferentially around the orbit of said bar.

4. Instrument according to claim 1 in which said bar is a bipolar permanent magnet, and said magnetically inductive means comprises a ring of magnetic material and a circular coil winding disposed coaxially with said second axis, said ring having a greater reluctance in the direction across its section than it has peripherally.

5. Instrument according to claim 1 in which said bar is a bipolar permanent magnet and said magnetically inductive means comprises a plurality of coils each of arcuate form and symmetrically circularly disposed about said second axis and surrounding the orbit of said bar.

6. Instrument according to claim 1 in which said electrical signals are in terms of alternating voltage and of the phase of alternations thereof as referred to said second axis whereby voltage interprets amplitude of oscillations of said bar and phase interprets an axis of angular reorientation of said second axis.

7. A dynamic indicating instrument comprising a bar, a gimbal member, means pivotally rockably interattaching the bar and gimbal member on a first axis, means for continuously spinning said gimbal member on a second axis normal to the first axis, means to project a beam of energy towards the orbit of said bar, means to receive said beam, and a frusto-spherical shell mounted peripherally on the bar, said shell having predetermined areas opaque and transparent to said beam of energy and moving with said bar alternatively to obstruct or to pass said beam according to rocking of said bar whilst spinning.

8. Instrument according to claim 7 in which said means to project a beam of energy comprises lamp means to project the beam as light, and said means to receive the beam comprises photoelectric means.

9. Indicating instrument comprising a bar, a gimbal member, means pivotally rockably interattaching the bar and gimbal member on a first axis, means for spinning said gimbal member on a second axis normal to the first axis, an obturator means comprising a fruso-spherical shell whose area is partly opaque and partly transparent mounted peripherally on said bar, a plurality of light-sources arranged symmetrically about said second axis to project beams substantially radially inwardly incident to said obturator means, and a correspondingly arranged plurality of photosensitive receivers to receive beams passed by said obturator means.

10. Instrument according to claim 9 in which the light-sources and the receivers are four in number and are peripherally disposed at 90° about said second axis.

11. Instrument according to claim 9 in which the light-sources and the receivers are four in number and are peripherally disposed at 90° about said second axis, and in which said sources and corresponding receivers are arranged in two pairs, a pair to each side of the undisturbed plane of spin of said bar and the members of each such pair being peripherally spaced 180° about said second axis.

12. Instrument according to claim 9, further comprising a plurality of mirrors corresponding to said light-sources, said mirrors being fixedly mounted within the space defined by said obturator means and so as to reflect the beams from the sources to the receivers.

13. Instrument according to claim 9 in which the said obturator has an opaque continuous median area obstructing beam passage when the said bar spins undisturbed, and marginal transparent areas to allow beam passage when the said bar spins and oscillates, said transparent areas defining beam passage in terms of amplitude of and phase of such oscillation with reference to said second axis.

14. Instrument for measuring rate of turn and indicating orientation of axis of turn comprising a magnetic bar, a gimbal member, means pivotally rockably interattaching said bar and gimbal member on a first axis, a casing, bearing means to support said gimbal member for spinning in said casing on a second axis normal to the first axis, means external to said casing for spinning said gimbal, and a coil system supported by said casing peripherally to the orbit of said bar about said second axis to measure and phasewise to locate oscillations of said bar about said first axis whilst spinning about said second axis.

15. Instrument for measuring rate of turn and indicating orientation of axis of turn comprising a bar, a gimbal member, means pivotally rockably interattaching said bar and gimbal member on a first axis, a casing, windows in said casing, bearing means to support said gimbal member for spinning in said casing on a second axis normal to the first axis, means external to said casing for spinning said gimbal, lamps supported by said casing to project beams inwardly through said windows, a frusto-spherical light-obturating shell mounted to spin and rock with said bar, light-sensitive receiving means responsive to light passed by said obturator shell, and means to measure the incidence of light on said receiving means in terms of amplitude of rocking of the bar and the phase relation of such rocking with respect to said second axis.

References Cited by the Examiner

UNITED STATES PATENTS 2,208,147   7/1940   Eisler _____ 340—190

NEIL C. READ, *Primary Examiner.*

THOMAS B. HABECKER, *Examiner.*